(12) United States Patent
Dimatteo et al.

(10) Patent No.: US 11,584,976 B2
(45) Date of Patent: Feb. 21, 2023

(54) HIGH-PERFORMANCE METAL ALLOY FOR ADDITIVE MANUFACTURING OF MACHINE COMPONENTS

(71) Applicant: Nuovo Pignone Tecnologie—S.r.l., Florence (IT)

(72) Inventors: Antonella Dimatteo, Florence (IT); Iacopo Giovannetti, Florence (IT)

(73) Assignee: NUOVO PIGNONE TECNOLOGIE —S.R.L., Florence (IT)

( * ) Notice: Subject to any disclaimer, the term of this patent is extended or adjusted under 35 U.S.C. 154(b) by 36 days.

(21) Appl. No.: 17/014,361

(22) Filed: Sep. 8, 2020

(65) Prior Publication Data

US 2020/0399740 A1    Dec. 24, 2020

Related U.S. Application Data

(63) Continuation of application No. PCT/EP2019/025069, filed on Mar. 15, 2019.

(51) Int. Cl.
| | | |
|---|---|---|
| *C22C 19/07* | (2006.01) | |
| *C22C 1/02* | (2006.01) | |
| *B33Y 10/00* | (2015.01) | |
| *B33Y 80/00* | (2015.01) | |
| *B33Y 70/00* | (2020.01) | |

(52) U.S. Cl.
CPC .............. *C22C 19/07* (2013.01); *B33Y 10/00* (2014.12); *B33Y 70/00* (2014.12); *B33Y 80/00* (2014.12); *C22C 1/02* (2013.01)

(58) Field of Classification Search
CPC .................................. C22C 19/07; C22F 1/10
See application file for complete search history.

(56) References Cited

U.S. PATENT DOCUMENTS

| | | |
|---|---|---|
| 6,075,839 A | 6/2000 | Treseder |
| 6,077,615 A | 6/2000 | Yada et al. |
| 6,986,951 B2 | 1/2006 | Giannozzi |
| 9,593,583 B2 | 3/2017 | Walker et al. |
| 2013/0338757 A1 | 12/2013 | Gerold |
| 2018/0312946 A1 | 11/2018 | Gigliotti, Jr. et al. |

FOREIGN PATENT DOCUMENTS

| | | |
|---|---|---|
| CN | 1346724 A | 5/2002 |
| CN | 106319289 A | 1/2017 |
| JP | S59 232247 A | 12/1984 |
| JP | S63 162831 A | 7/1988 |
| JP | H10 226838 A | 8/1998 |
| RU | 2311472 C2 | 11/2007 |
| RU | 2454476 C2 | 6/2012 |
| RU | 2567759 C2 | 11/2015 |
| WO | 2016/071177 A1 | 5/2016 |

OTHER PUBLICATIONS

International Search Report of the International Searching Authority for PCT/EP2019/025069 dated Apr. 24, 2019.

*Primary Examiner* — Jessee R Roe
(74) *Attorney, Agent, or Firm* — Baker Hughes Patent Organization

(57) ABSTRACT

A high-performance metal alloy is disclosed being suitable for additive manufacturing of machine components, in particular machine components which are subjected to high gas temperature stress. Exemplary machine components are statoric components of gas turbines, such as nozzles.

16 Claims, 2 Drawing Sheets

Fig. 1 – Prior art

HIGH-PERFORMANCE METAL ALLOY FOR ADDITIVE MANUFACTURING OF MACHINE COMPONENTS

CROSS-REFERENCE TO RELATED APPLICATIONS

This is a continuation of International Application PCT/EP2019/025069, with an international filing date of Mar. 15, 2019, filed by applicant, the disclosure of which is hereby incorporated by reference in its entirety.

TECHNICAL FIELD

Embodiments of the subject matter disclosed herein relate primarily to a high-performance metal alloy for additive manufacturing of machine components, in particular machine components which are subjected to high gas temperature stress. Exemplary machine components are statoric components of gas turbines, such as nozzles.

BACKGROUND ART

Internal combustion engine components, such as gas turbine components (e.g. buckets, nozzles, shrouds, combustion chambers), must be manufactured with metal alloys which are capable of withstanding high-temperature operating conditions. This is particularly true for components which are located near the combustors of the gas turbine, such as the turbine nozzles. The combustion gas temperature in the first stage nozzles can be 1100° C. or higher, while in the most downstream turbine stages the temperature drops to around 650-700° C.

Special high-temperature, nickel-based alloys are used for manufacturing rotary components, such as the blades of the first turbine stages. These alloys are expensive but are required in view of need to withstand the combined effect of high temperature and high dynamic stresses generated in the rotary part of the turbomachine.

Stationary components, such as nozzles, stationary buckets or other statoric parts of gas turbines are often manufactured using less expensive Co-based alloys, such as FSX414. These materials have relatively high carbon content, in the range of 0.2-0.3% by weight and are commonly used in casting processes. Carbon tends to precipitate in the form of carbides, which provide high mechanical strength. Stationary turbomachine components have often a complex shape. Manufacturing thereof would take advantage of modern additive manufacturing techniques, such as DMLM (Direct Metal Laser Melting) technology. Additive manufacturing allows complex mechanical components to be manufactured starting from a file containing data on the shape of the final article of manufacture to be produced, which data are directly used to control an energy source, such as a laser source or an electron beam. Commonly used additive manufacturing alloys, such as CoCrMo alloys, however, have been proved to be unsatisfactory for manufacturing of turbomachine components which are operating under high-temperature conditions. This is particularly due to the formation of a brittle phase above 900° C. operating temperature.

On the other hand, FSX414 alloys are unsuitable for additive manufacturing processes, as they give rise to cracks during fast cooling of the sequentially melted layers of powder material.

In particular, first stage nozzles are subjected to the hottest gas temperatures in the turbine, but to lower mechanical stresses than buckets. The nozzles are required to have excellent high-temperature oxidation and corrosion resistance, high resistance to thermal fatigue, relatively good weldability for ease of manufacture and repair, and good castability.

SUMMARY

There is thus a need for a metal alloy which is economically affordable and technically suitable for additive manufacturing of high-temperature turbomachine components, such as statoric components, for example nozzles.

An important idea is to provide an alloy wherein the selected elements in selected ranges allows to significantly increase the high-temperature oxidation and corrosion resistance, high resistance to thermal fatigue, relatively good weldability for ease of manufacture and repair, by minimizing the microstructural defects.

This alloy can be produced by conventional processes such as Powder Metallurgy and Investment Casting, as well as innovative Additive Manufacturing technologies (e.g. Direct Metal Laser Melting processes).

First embodiments of the subject matter disclosed herein correspond to a high-performance metal alloy having a nominal composition consisting of:

| | |
|---|---|
| O | up to 0.1 wt % |
| N | up to 0.03 wt % |
| S | less than 0.004 wt % |
| C | up to 0.20 wt % |
| Mn | 0.6-1.4 wt % |
| Si | 0.75-2.0 wt % |
| P | less than 0.05 wt % |
| Cr | 25-35 wt % |
| Ni | 10.6-15.6 wt % |
| W | 2-10 wt % |
| Fe | 0.3-0.9 wt % |
| Ta | less than 0.04 wt % |
| B | up to 0.008 wt % |
| Cu | less than 0.02 wt % |
| Zr | less than 0.003 wt % |
| Co | balance, based on the alloy weight. |

In general, said alloy shows remarkably and substantially reduced microstructural defects once processed by Additive Manufacturing technologies, with respect to conventional Co-based alloys, while showing high-temperature oxidation and corrosion resistance and high resistance to thermal fatigue.

Second embodiments of the subject matter disclosed herein correspond to a gas turbine component, such as a statoric component, for example a nozzle, made of the above alloy.

BRIEF DESCRIPTION OF DRAWINGS

The accompanying drawings, which are incorporated herein and constitute a part of the specification, illustrate exemplary embodiments of the present subject matter and, together with the detailed description, explain these embodiments. In the drawings.

DETAILED DESCRIPTION

Figure 1:
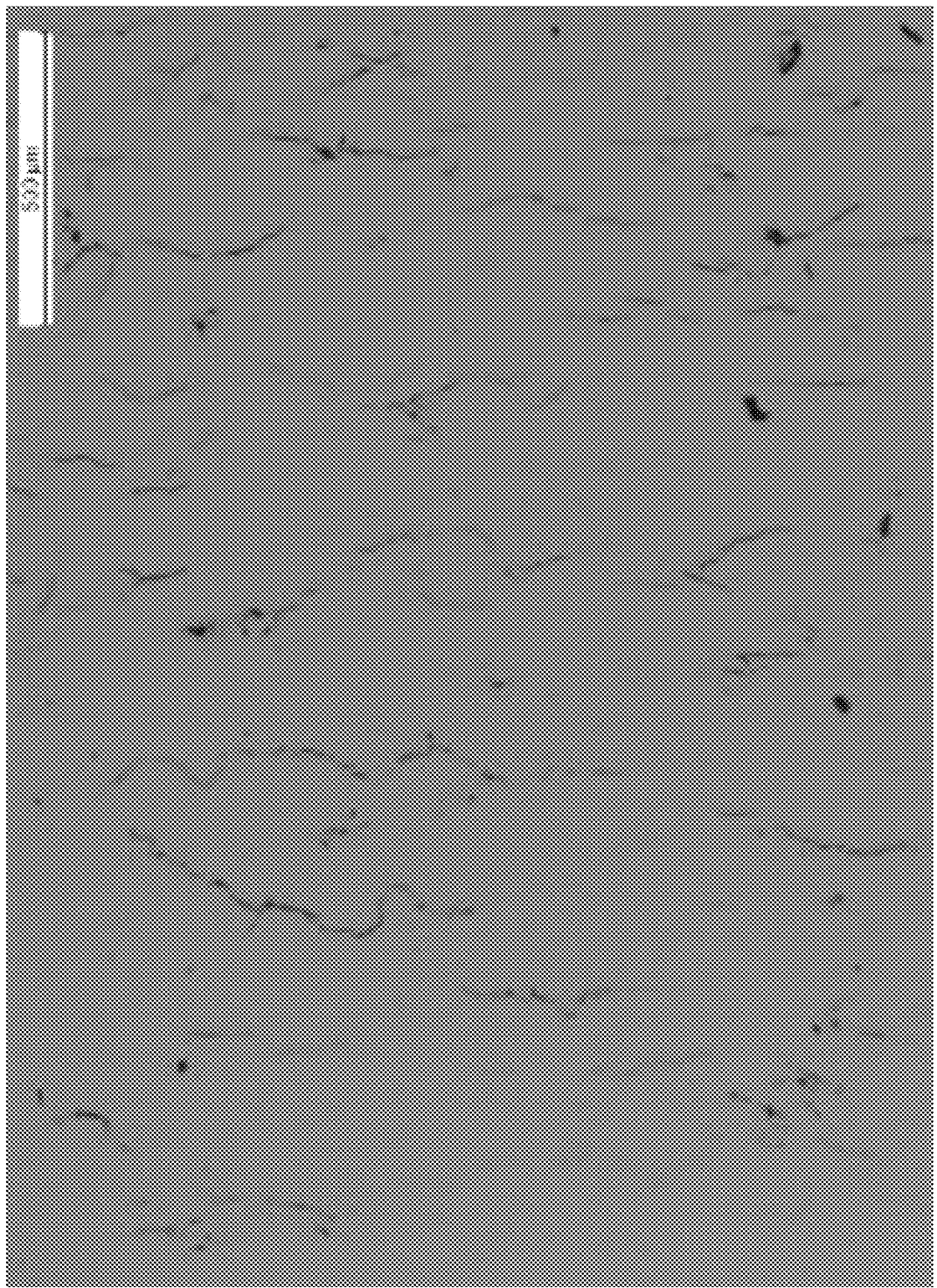
FIG. 1 shows a micrograph taken by Optical Microscope (magnification 50×) of the microstructure of a conventional alloy 'FSX414' of related art, as produced by Additive Manufacturing Process, where a high level of microstructural defects is visible.

The following description of exemplary embodiments refers to the accompanying drawings. The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

First embodiments of the subject matter disclosed herein correspond to a high-performance metal alloy having a nominal composition consisting of:

| | |
|---|---|
| O | up to 0.1 wt % |
| N | up to 0.03 wt % |
| S | less than 0.004 wt % |
| C | up to 0.20 wt % |
| Mn | 0.6-1.4 wt % |
| Si | 0.76-2.0 wt % |
| P | less than 0.05 wt % |
| Cr | 25-35 wt % |
| Ni | 10.6-15.6 wt % |
| W | 2-10 wt % |
| Fe | 0.3-0.9 wt % |
| Ta | less than 0.04 wt % |
| B | less than 0.008 wt % |
| Cu | less than 0.02 wt % |
| Zr | less than 0.003 wt % |
| Co | balance, based on the alloy weight. |

It should be appreciated that the alloy above encompasses reduced amounts of Carbon and Boron, so as to show remarkably and substantially reduced microstructural defects once processed by Additive Manufacturing technologies, with respect to the current best in class Co-based alloys (i.e. FSX414), while showing high-temperature oxidation and corrosion resistance and high resistance to thermal fatigue, as it will be demonstrated in the following working examples.

With the term "up to", it is meant that the element is present and in a wt % up to the upper limit value included.

With the term "less than", it is meant that the wt % ranges from the upper limit value included down to 0 (zero) included, so that the element can be absent.

In some embodiments of the high-performance metal alloy, C is present in an amount up to 0.15 wt %; preferably in an amount up to 0.10 wt %; more preferably in an amount of 0.001-0.07 wt %. Reduced amounts of Carbon allow to achieve an advantageous balance between mechanical properties and microstructure goodness in Additive Manufacturing alloy; moreover reduced amounts of Carbon give enhanced mechanical properties in Investment Casting Alloy.

In other embodiments of the high-performance metal alloy, B is present in an amount less than 0.004 wt %. Reduced amounts of Boron allow to improve Additive Manufacturing manufacturability.

In other embodiments of the high-performance metal alloy, N is present in an amount of 0.001-0.025 wt %. The presence of Nitrogen allows to strengthen the alloy.

In other embodiments of the high-performance metal alloy, Mn is present in an amount of 0.6-1.0 wt %. These amounts of Manganese improve mechanical properties as from the solid solution during the preparation process.

In other embodiments of the high-performance metal alloy, Si is present in an amount of 0.8-1.5 wt %. These amounts of Silicon improve mechanical properties as from the solid solution during the preparation process.

In other embodiments of the high-performance metal alloy, Ni is present in an amount of 10.8-13.5 wt %. These amounts of Nickel improve mechanical properties as from the solid solution during the preparation process.

In other embodiments of the high-performance metal alloy, Fe is present in an amount of 0.4-0.8 wt %.

In preferred embodiments, the high-performance metal alloy has a nominal composition consisting of:

| | |
|---|---|
| O | up to 0.1 wt % |
| N | 0.001-0.025 wt % |
| S | less than 0.004 wt % |
| C | 0.001-0.07 wt % |
| Mn | 0.6-1.0 wt % |
| Si | 0.8-1.5 wt % |
| P | less than 0.05 wt % |
| Cr | 25-35 wt % |
| Ni | 10.8-13.5 wt % |
| W | 2-10 wt % |
| Fe | 0.4-0.9 wt % |
| Ta | less than 0.04 wt % |
| B | less than 0.004 wt % |
| Cu | less than 0.02 wt % |
| Zr | less than 0.003 wt % |
| Co | balance, based on the alloy weight. |

In particularly preferred embodiments of the high-performance metal alloy,

| | |
|---|---|
| O | 0.01-0.05 wt % |
| N | 0.005-0.025 wt % |
| S | less than 0.003 wt % |
| C | 0.005-0.07 wt % |
| Mn | 0.6-0.8 wt % |
| Si | 0.8-1.0 wt % |
| P | less than 0.04 wt % |
| Cr | 27-33 wt % |
| Ni | 11-12 wt % |
| W | 5-9 wt % |
| Fe | 0.4-0.7 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

A particularly preferred embodiment corresponds to a high-performance metal alloy having a nominal composition consisting of:

| | |
|---|---|
| O | 0.036 wt % |
| N | 0.024 wt % |
| S | less than 0.003 wt % |
| C | 0.009 wt % |
| Mn | 0.71 wt % |
| Si | 0.91 wt % |
| P | less than 0.04 wt % |

| | |
|---|---|
| Cr | 29.76 wt % |
| Ni | 11.04 wt % |
| W | 6.98 wt % |
| Fe | 0.55 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

Another particularly preferred embodiment corresponds to a high-performance metal alloy having a nominal composition consisting of:

| | |
|---|---|
| O | 0.026 wt % |
| N | 0.007 wt % |
| S | less than 0.003 wt % |
| C | 0.039 wt % |
| Mn | 0.71 wt % |
| Si | 0.91 wt % |
| P | less than 0.04 wt % |
| Cr | 29.73 wt % |
| Ni | 11.05 wt % |
| W | 6.98 wt % |
| Fe | 0.54 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

With reference to FIG. 1, the observed microstructural defects of the current best in class Co-based alloys (i.e. FSX414) is characterized by linear appearance.

Figure 2:
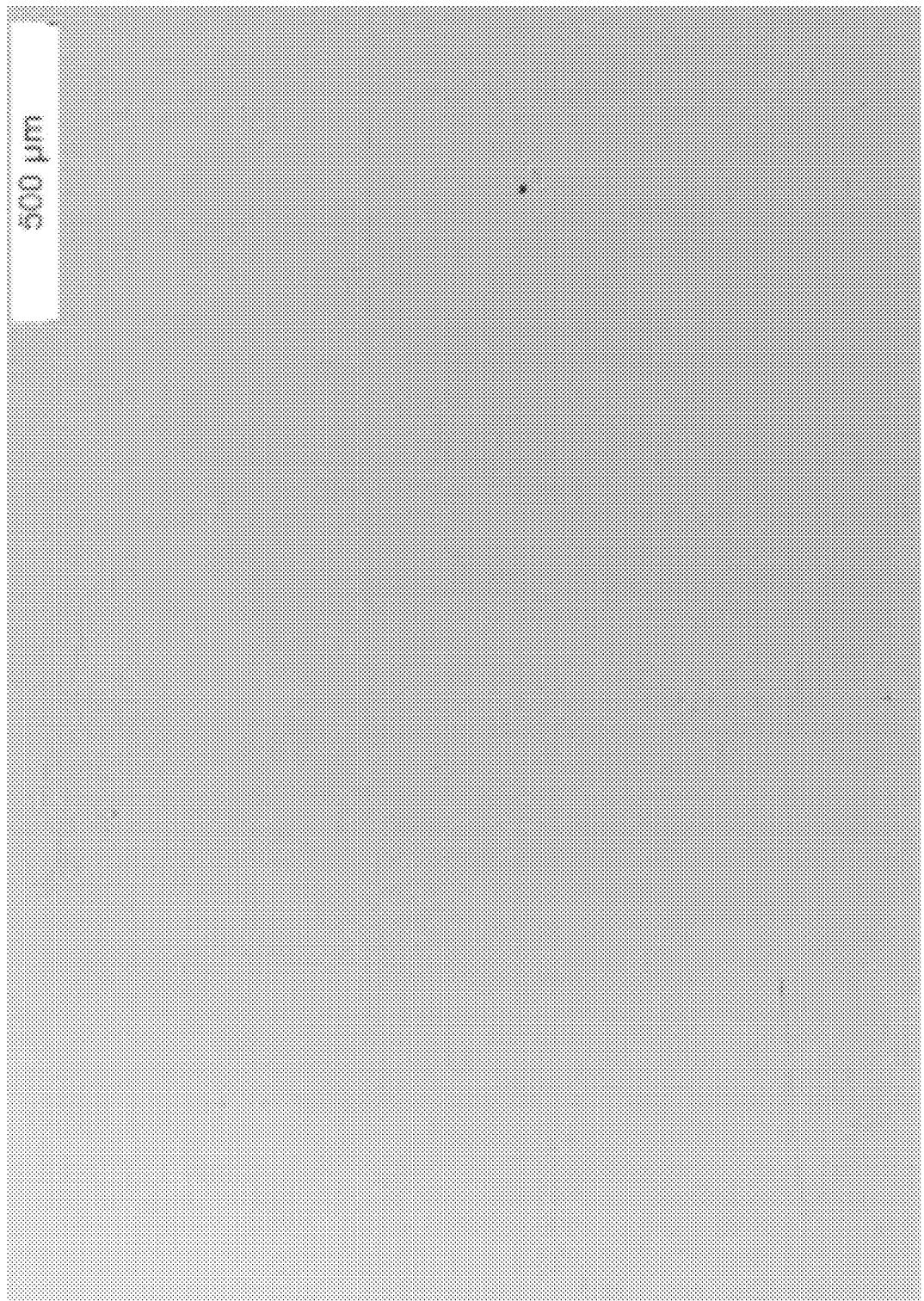
FIG. 2 shows a micrograph taken by Optical Microscope (magnification 50×) of the microstructure of the new alloy, where no defects (either cracks or pores) are visible.

Conversely, with reference with FIG. 2, the alloy herein disclosed shows a homogeneous surface without microstructural defects or discontinuities.

The alloy herein disclosed can be obtained by processes of additive manufacturing, such as electron beam melting (EBM), selective laser melting (SLM), selective laser sintering (SLS), laser metal forming (LMF), direct metal laser sintering (DMLS), and direct metal laser melting (DMLM).

In general, the process of production of the alloy can be carried out until a desired thickness and shape of the alloy is achieved.

However, in preferred processes, the alloy is obtained by Direct Metal Laser Melting (DMLM), without the need of Hot Isostatic Press (HIP) process. The resulting alloy solution is then properly solutioned and aged.

It should be understood that all aspects identified as preferred and advantageous for the alloy are to be deemed as similarly preferred and advantageous also for the respective processes of production.

Second embodiments of the subject matter disclosed herein correspond to a gas turbine component, such as a statoric component, for example a nozzle, made of the above alloy. Nozzles, and particularly first stage nozzles, are subjected to the hottest gas temperatures in the turbine, but to lower mechanical stresses than buckets. The nozzles made of the above alloy have excellent high-temperature oxidation and corrosion resistance, high resistance to thermal fatigue, relatively good weldability for ease of manufacture and repair, and good castability.

It should be also understood that all the combinations of preferred aspects of the alloy, and process of production, as well as their uses in gas turbine applications, as above reported, are to be deemed as hereby disclosed.

While the disclosed embodiments of the subject matter described herein have been fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

EXAMPLES

Example 1

An alloy has been prepared having the following nominal composition:

| | |
|---|---|
| O | 0.036 wt % |
| N | 0.024 wt % |
| S | less than 0.003 wt % |
| C | 0.009 wt % |
| Mn | 0.71 wt % |
| Si | 0.91 wt % |
| P | less than 0.04 wt % |
| Cr | 29.76 wt % |
| Ni | 11.04 wt % |
| W | 6.98 wt % |
| Fe | 0.55 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

The alloy was obtained by DMLM, wherein the power source had an energy power of about 250 W. The resulting powder layer thickness was of about 0.05 mm.

The power source scan spacing was preferably arranged in order to provide substantial overlapping of adjacent scan lines. An overlapping scan by the power source enabled stress reduction to be provided by the subsequent adjacent scan, and may effectively provide a continuously heat treated material.

The resulting alloy solution was then solutioned and aged.

Example 2

An alloy has been prepared having the following nominal composition:

| | |
|---|---|
| O | 0.026 wt % |
| N | 0.007 wt % |
| S | less than 0.003 wt % |
| C | 0.039 wt % |
| Mn | 0.71 wt % |
| Si | 0.91 wt % |
| P | less than 0.04 wt % |
| Cr | 29.73 wt % |
| Ni | 11.05 wt % |
| W | 6.98 wt % |
| Fe | 0.54 wt % |

-continued

| | |
|---|---|
| Ta | less than 0.001 wt % |
| B | less than 0.003 wt % |
| Cu | less than 0.001 wt % |
| Zr | less than 0.003 wt % |
| Co | balance, based on the alloy weight. |

The alloy was obtained by DMLM at the same conditions as in Example 1.

Comparative Example 3

A conventional FSX414 alloy has been prepared having the following nominal composition:

| | |
|---|---|
| S | 0.02 wt % |
| C | 0.29 wt % |
| Mn | 0.44 wt % |
| Si | 0.9 wt % |
| P | 0.01 wt % |
| Cr | 28.9 wt % |
| Ni | 10.6 wt % |
| W | 7.0 wt % |
| Fe | 0.05 wt % |
| B | 0.012 wt % |
| Co | balance, based on the alloy weight. |

The alloy was obtained by DMLM at the same conditions as in Example 1.

Example 4

The samples obtained in Example 1 and in Example 3 (i.e. conventional FSX414) by the same additive manufacturing process and parameters were examined along the building direction. They were conventionally metallographic prepared for Optical Microscope observation (magnification 50x). With reference to FIG. 1, the observed microstructural defects of the current best in class Co-based alloys (i.e. FSX414 of Example 3) is characterized by linear appearance.

Conversely, with reference with FIG. 2, the alloy of Example 1 shows a homogeneous surface without microstructural defects or discontinuities.

The invention claimed is:

1. A metal alloy having a nominal composition consisting of:

| | |
|---|---|
| O | up to 0.1 wt % |
| N | up to 0.03 wt % |
| S | less than 0.004 wt % |
| C | up to 0.20 wt % |
| Mn | 0.6-1.4 wt % |
| Si | 0.76-2.0 wt % |
| P | less than 0.05 wt% |
| Cr | 25-35 wt % |
| Ni | 10.6-15.6 wt % |
| W | 2-10 wt % |
| Fe | 0.3-0.9 wt % |
| Ta | less than 0.04 wt % |
| B | less than 0.008 wt % |
| Cu | less than 0.02 wt % |
| Zr | less than 0.003 wt % |
| Co | balance, based on the alloy weight. |

2. The metal alloy of claim 1, wherein C is present in an amount up to 0.15 wt %.

3. The metal alloy of claim 2, wherein C is present in an amount up to 0.10 wt %.

4. The metal alloy of claim 3, wherein C is present in an amount of 0.001-0.07 wt %.

5. The metal alloy of claim 1, wherein B is present in an amount less than 0.004 wt %.

6. The metal alloy of claim 1, wherein N is present in an amount of 0.001-0.025 wt %.

7. The metal alloy of claim 1, wherein Mn is present in an amount of 0.6-1.0 wt %.

8. The metal alloy of claim 1, wherein Si is present in an amount of 0.8-1.5 wt %.

9. The metal alloy of claim 1, wherein Ni is present in an amount of 10.8-13.5 wt %.

10. The metal alloy of claim 1, wherein Fe is present in an amount of 0.4-0.8 wt %.

11. The metal alloy of claim 1, having a nominal composition consisting of:

| | |
|---|---|
| O | up to 0.1 wt % |
| N | 0.001-0.025 wt % |
| S | less than 0.004 wt % |
| C | 0.001-0.07 wt % |
| Mn | 0.6-1.0 wt % |
| Si | 0.8-1.5 wt % |
| P | less than 0.05 wt % |
| Cr | 25-35 wt % |
| Ni | 10.8-13.5 wt % |
| W | 2-10 wt % |
| Fe | 0.4-0.9 wt % |
| Ta | less than 0.04 wt % |
| B | less than 0.004 wt % |
| Cu | less than 0.02 wt % |
| Zr | less than 0.003 wt % |
| Co | balance, based on the alloy weight. |

12. The metal alloy of claim 11, having a nominal composition consisting of:

| | |
|---|---|
| O | 0.01-0.05 wt % |
| N | 0.005-0.025 wt % |
| S | less than 0.003 wt % |
| C | 0.005-0.07 wt % |
| Mn | 0.6-0.8 wt % |
| Si | 0.8-1.0 wt % |
| P | less than 0.04 wt % |
| Cr | 27-33 wt % |
| Ni | 11-12 wt % |
| W | 5-9 wt % |
| Fe | 0.4-0.7 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

13. The metal alloy of claim 12, having a nominal composition consisting of:

| | |
|---|---|
| O | 0.036 wt % |
| N | 0.024 wt % |
| S | less than 0.003 wt % |
| C | 0.009 wt % |
| Mn | 0.71 wt % |
| Si | 0.91 wt % |
| P | less than 0.04 wt % |

| | |
|---|---|
| Cr | 29.76 wt % |
| Ni | 11.04 wt % |
| W | 6.98 wt % |
| Fe | 0.55 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

14. The metal alloy of claim 12, having a nominal composition consisting of:

| | |
|---|---|
| O | 0.026 wt % |
| N | 0.007 wt % |
| S | less than 0.003 wt % |
| C | 0.039 wt % |
| Mn | 0.71 wt % |
| Si | 0.91 wt % |
| P | less than 0.04 wt % |
| Cr | 29.73 wt % |
| Ni | 11.05 wt % |
| W | 6.98 wt % |
| Fe | 0.54 wt % |
| Ta | less than 0.001 wt % |
| B | less than 0.003 wt % |
| Cu | less than 0.001 wt % |
| Zr | less than 0.003 wt % |
| Co | balance, based on the alloy weight. |

15. The metal alloy of claim 1, obtainable by an additive manufacturing process selected from electron beam melting (EBM), selective laser melting (SLM), selective laser sintering (SLS), laser metal forming (LMF), direct metal laser sintering (DMLS), and direct metal laser melting (DMLM).

16. A gas turbine component, the component being a nozzle, made of the alloy of claim 1.

* * * * *